(12) United States Patent
Durazo et al.

(10) Patent No.: US 7,716,593 B2
(45) Date of Patent: May 11, 2010

(54) CONVERSATION GROUPING OF ELECTRONIC MAIL RECORDS

(75) Inventors: Jose H. Durazo, Seattle, WA (US); Jensen M. Harris, Kirkland, WA (US); Jesse Clay Satterfield, Seattle, WA (US); Martijn E. Van Tilburg, Seattle, WA (US); William A. Avery, Redmond, WA (US); Bruce D. Wiedemann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 10/851,442

(22) Filed: May 21, 2004

(65) Prior Publication Data

US 2005/0004990 A1    Jan. 6, 2005

Related U.S. Application Data

(60) Provisional application No. 60/484,437, filed on Jul. 1, 2003.

(51) Int. Cl.
*G06F 3/00* (2006.01)
*G06F 15/16* (2006.01)

(52) U.S. Cl. .................... 715/752; 709/206; 709/207
(58) Field of Classification Search ............. 715/752; 709/206, 207
See application file for complete search history.

(56) References Cited

U.S. PATENT DOCUMENTS

| | | | |
|---|---|---|---|
| 5,155,806 A | 10/1992 | Hoeber et al. | 715/711 |
| 5,377,354 A | 12/1994 | Scannell et al. | 718/103 |
| 5,500,936 A | 3/1996 | Allen et al. | 395/156 |
| 5,519,606 A | 5/1996 | Frid-Nielsen et al. | 705/9 |
| 5,559,944 A | 9/1996 | Ono | 715/841 |
| 5,570,109 A | 10/1996 | Jenson | 715/823 |
| 5,596,694 A | 1/1997 | Capps | 345/473 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A | 7/1997 | Tuniman et al. | 715/810 |

(Continued)

FOREIGN PATENT DOCUMENTS

EP    0 910 007    4/1999

(Continued)

OTHER PUBLICATIONS

Marshall School of Business Workshop 1—Introduction to Outlook & E-mail Apr. 6, 2000 pp. 1-11.*

(Continued)

*Primary Examiner*—William L Bashore
*Assistant Examiner*—Andrea N Long
(74) *Attorney, Agent, or Firm*—Merchant & Gould

(57) ABSTRACT

Improved conversation grouping methods and systems are provided for electronic mail records. Electronic mail messages that are unread or flagged for follow-up are automatically displayed under an associated conversation grouping heading. If a conversation grouping contains only a single unread or flagged electronic mail message, the single electronic mail message is automatically displayed under the conversation grouping heading for review by a user. For a conversation grouping having no unread or flagged electronic mail messages, the latest electronic mail message in the grouping is automatically displayed under the conversation grouping heading.

18 Claims, 4 Drawing Sheets

U.S. PATENT DOCUMENTS

| | | | |
|---|---|---|---|
| 5,664,127 A | 9/1997 | Anderson et al. | 715/776 |
| 5,664,208 A | 9/1997 | Pavley et al. | 715/209 |
| 5,721,847 A | 2/1998 | Johnson | 395/333 |
| 5,760,773 A | 6/1998 | Berman et al. | 715/808 |
| 5,761,646 A | 6/1998 | Frid-Nielsen et al. | 705/9 |
| 5,778,402 A | 7/1998 | Gipson | 707/530 |
| 5,778,404 A | 7/1998 | Capps et al. | 715/531 |
| 5,805,167 A | 9/1998 | Van Cruyningen | 715/808 |
| 5,821,936 A | 10/1998 | Shaffer et al. | 715/810 |
| 5,828,376 A | 10/1998 | Solimene et al. | 715/821 |
| 5,842,009 A | 11/1998 | Borovoy et al. | 707/1 |
| 5,844,558 A | 12/1998 | Kumar et al. | 345/339 |
| 5,844,572 A | 12/1998 | Schott | |
| 5,855,006 A | 12/1998 | Huemoeller et al. | 705/9 |
| 5,885,006 A | 3/1999 | Sheedy | 384/192 |
| 5,893,125 A | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A * | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,018,343 A | 1/2000 | Wang et al. | 345/356 |
| 6,034,683 A | 3/2000 | Mansour et al. | 715/764 |
| 6,067,087 A | 5/2000 | Krauss et al. | 715/762 |
| 6,072,492 A | 6/2000 | Schagen et al. | 715/733 |
| 6,085,206 A | 7/2000 | Domini et al. | 707/533 |
| 6,101,480 A | 8/2000 | Conmy et al. | 705/9 |
| 6,133,915 A | 10/2000 | Arcuri et al. | 715/779 |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 707/505 |
| 6,211,879 B1 | 4/2001 | Soohoo | 345/357 |
| 6,216,122 B1 | 4/2001 | Elson | 707/3 |
| 6,219,670 B1 | 4/2001 | Mocek et al. | 707/102 |
| 6,222,540 B1 | 4/2001 | Sacerdoti | 345/440 |
| 6,232,971 B1 | 5/2001 | Haynes | 345/340 |
| 6,236,396 B1 | 5/2001 | Jenson et al. | 715/764 |
| 6,256,628 B1 | 7/2001 | Dobson et al. | 707/6 |
| 6,289,317 B1 | 9/2001 | Peterson | 705/7 |
| 6,307,544 B1 | 10/2001 | Harding | 715/709 |
| 6,323,883 B1 | 11/2001 | Minoura et al. | 715/784 |
| 6,353,451 B1 | 3/2002 | Teibel et al. | 345/803 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,405,216 B1 | 6/2002 | Minnaert et al. | 707/104.1 |
| 6,424,829 B1 | 7/2002 | Kraft | 455/412.1 |
| 6,456,304 B1 | 9/2002 | Angiulo et al. | 345/779 |
| 6,466,236 B1 | 10/2002 | Pivowar et al. | 715/835 |
| 6,469,722 B1 | 10/2002 | Kinoe et al. | 345/837 |
| 6,480,865 B1 | 11/2002 | Lee et al. | 715/523 |
| 6,493,006 B1 | 12/2002 | Gourdol et al. | 715/825 |
| 6,493,731 B1 | 12/2002 | Jones et al. | 707/501.1 |
| 6,546,417 B1 | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,664,983 B2 | 12/2003 | Ludolph | 715/775 |
| 6,680,749 B1 | 1/2004 | Anderson et al. | 348/231.99 |
| 6,691,281 B1 | 2/2004 | Sorge et al. | 715/503 |
| 6,708,205 B2 | 3/2004 | Sheldon et al. | 709/206 |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 | 6/2004 | Sugimoto | 715/838 |
| 6,785,868 B1 | 8/2004 | Raff | 715/530 |
| 6,825,859 B1 | 11/2004 | Severenuk et al. | 345/764 |
| 6,850,255 B2 | 2/2005 | Muschetto | 715/788 |
| 6,871,195 B2 | 3/2005 | Ryan et al. | 706/46 |
| 6,882,354 B1 | 4/2005 | Nielsen | 715/784 |
| 6,904,449 B1 | 6/2005 | Quinones | 709/203 |
| 6,906,717 B2 | 6/2005 | Couckuyt et al. | 345/440 |
| 6,915,492 B2 | 7/2005 | Kurtenbach et al. | 715/810 |
| 6,964,025 B2 | 11/2005 | Angiulo | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 7,039,596 B1 | 5/2006 | Lu | 705/8 |
| 7,046,848 B1 | 5/2006 | Olcott | 382/176 |
| 7,107,544 B1 * | 9/2006 | Luke | 715/752 |
| 7,110,936 B2 | 9/2006 | Hiew et al. | 703/22 |
| 7,152,207 B1 | 12/2006 | Underwood et al. | 715/526 |
| 7,188,073 B1 | 3/2007 | Tam et al. | 705/9 |
| 7,212,208 B2 | 5/2007 | Khozai | 345/440 |
| 7,216,301 B2 | 5/2007 | Moehrle | 715/811 |
| 7,249,325 B1 | 7/2007 | Donaldson | 715/777 |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,392,249 B1 | 6/2008 | Harris et al. | |
| 7,505,954 B2 | 3/2009 | Heidloff et al. | 707/1 |
| 7,530,029 B2 | 5/2009 | Satterfield et al. | 715/779 |
| 7,567,964 B2 | 7/2009 | Brice et al. | 707/9 |
| 2002/0007380 A1 | 1/2002 | Bauchot et al. | 707/530 |
| 2002/0037754 A1 | 3/2002 | Hama et al. | 455/566 |
| 2002/0052721 A1 | 5/2002 | Ruff et al. | 703/1 |
| 2002/0070977 A1 | 6/2002 | Morcos et al. | 345/810 |
| 2002/0075330 A1 | 6/2002 | Rosenzweig et al. | 345/854 |
| 2002/0078143 A1 | 6/2002 | DeBoor et al. | |
| 2002/0122071 A1 | 9/2002 | Camara et al. | |
| 2002/0133557 A1 | 9/2002 | Winarski | 709/207 |
| 2002/0135621 A1 | 9/2002 | Angiulo et al. | 345/838 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0163538 A1 | 11/2002 | Shteyn | 345/752 |
| 2002/0175955 A1 | 11/2002 | Gourdol et al. | 345/821 |
| 2003/0009455 A1 | 1/2003 | Carlson et al. | 707/6 |
| 2003/0011638 A1 | 1/2003 | Chung | 345/808 |
| 2003/0011639 A1 | 1/2003 | Webb | 345/808 |
| 2003/0014490 A1 * | 1/2003 | Bates et al. | 709/206 |
| 2003/0022700 A1 | 1/2003 | Wang | 455/566 |
| 2003/0035917 A1 | 2/2003 | Hyman | 428/67 |
| 2003/0038832 A1 | 2/2003 | Sobol | |
| 2003/0043211 A1 | 3/2003 | Kremer et al. | |
| 2003/0066025 A1 | 4/2003 | Garner et al. | 715/500 |
| 2003/0093490 A1 | 5/2003 | Yamamoto et al. | 709/213 |
| 2003/0097361 A1 | 5/2003 | Huang et al. | 707/10 |
| 2003/0098891 A1 | 5/2003 | Molander | 715/841 |
| 2003/0110191 A1 | 6/2003 | Handsaker et al. | 707/503 |
| 2003/0112278 A1 | 6/2003 | Driskell | 715/788 |
| 2003/0167310 A1 | 9/2003 | Moody et al. | 709/206 |
| 2003/0169284 A1 | 9/2003 | Dettinger et al. | 707/3 |
| 2003/0195937 A1 | 10/2003 | Kircher et al. | 709/207 |
| 2003/0206646 A1 | 11/2003 | Bracket | |
| 2003/0218611 A1 | 11/2003 | Ben-Tovim et al. | 345/440 |
| 2003/0226106 A1 | 12/2003 | McKellar et al. | 715/513 |
| 2003/0227487 A1 | 12/2003 | Hugh | 715/777 |
| 2003/0233419 A1 | 12/2003 | Beringer | 709/206 |
| 2004/0003351 A1 | 1/2004 | Sommerer et al. | 715/251 |
| 2004/0012633 A1 | 1/2004 | Helt | |

| | | | | | | |
|---|---|---|---|---|---|---|
| 2004/0056894 | A1 | 3/2004 | Zaika et al. ............... 345/762 | GB | 2 391 148 | 1/2004 |
| 2004/0090315 | A1 | 5/2004 | Mackjust et al. ....... 340/426.13 | WO | WO 99/04353 | 1/1999 |
| 2004/0100504 | A1 | 5/2004 | Sommer ..................... 345/810 | WO | WO 99/27495 | 6/1999 |
| 2004/0100505 | A1 | 5/2004 | Cazier ....................... 345/811 | WO | WO 02/091162 A3 | 11/2002 |
| 2004/0107197 | A1 | 6/2004 | Shen et al. ..................... 707/9 | WO | WO 03/098500 | 11/2003 |
| 2004/0109025 | A1 | 6/2004 | Hullot et al. ............... 715/764 | | | |
| 2004/0109033 | A1 | 6/2004 | Vienneau et al. ........... 345/863 | | | |
| 2004/0119760 | A1 | 6/2004 | Grossman et al. .......... 715/854 | | | |
| 2004/0128275 | A1 | 7/2004 | Moehrle ....................... 707/1 | | | |
| 2004/0133854 | A1 | 7/2004 | Black ......................... 715/517 | | | |
| 2004/0142720 | A1 | 7/2004 | Smethers ................ 455/550.1 | | | |
| 2004/0164983 | A1 | 8/2004 | Khozai ....................... 345/440 | | | |
| 2004/0168153 | A1 | 8/2004 | Marvin ....................... 717/120 | | | |
| 2004/0186775 | A1 | 9/2004 | Margiloff et al. ............. 705/14 | | | |
| 2004/0221234 | A1 | 11/2004 | Imai ........................... 715/256 | | | |
| 2004/0230508 | A1 | 11/2004 | Minnis et al. ................. 705/5 | | | |
| 2004/0230906 | A1 | 11/2004 | Pik et al. .................... 715/522 | | | |
| 2004/0239700 | A1 | 12/2004 | Baschy ....................... 715/781 | | | |
| 2004/0243938 | A1 | 12/2004 | Weise et al. ................. 715/205 | | | |
| 2005/0004990 | A1 | 1/2005 | Durazo et al. .............. 709/206 | | | |
| 2005/0005249 | A1 | 1/2005 | Hill et al. .................... 715/963 | | | |
| 2005/0021504 | A1 | 1/2005 | Atchison ....................... 707/3 | | | |
| 2005/0022116 | A1 | 1/2005 | Bowman et al. ............. 715/513 | | | |
| 2005/0039142 | A1 | 2/2005 | Jalon et al. .................. 715/823 | | | |
| 2005/0044500 | A1 | 2/2005 | Orimoto et al. ............. 715/706 | | | |
| 2005/0057584 | A1 | 3/2005 | Gruen et al. ................ 345/752 | | | |
| 2005/0086135 | A1 | 4/2005 | Lu ................................ 705/30 | | | |
| 2005/0117179 | A1 | 6/2005 | Ito et al. .................... 358/1.15 | | | |
| 2005/0138576 | A1 | 6/2005 | Baumert et al. ............. 715/862 | | | |
| 2005/0172262 | A1 | 8/2005 | Lalwani ...................... 717/109 | | | |
| 2005/0216863 | A1 | 9/2005 | Schumacher et al. ........ 715/827 | | | |
| 2005/0223329 | A1 | 10/2005 | Schwartz et al. ............ 715/711 | | | |
| 2005/0256867 | A1 | 11/2005 | Walther et al. ................. 707/5 | | | |
| 2005/0278656 | A1 | 12/2005 | Goldthwaite et al. ........ 715/810 | | | |
| 2005/0289156 | A1 | 12/2005 | Maryka et al. .............. 707/100 | | | |
| 2006/0020962 | A1 | 1/2006 | Stark et al. .................... 725/32 | | | |
| 2006/0036580 | A1 | 2/2006 | Stata ............................. 707/3 | | | |
| 2006/0036945 | A1 | 2/2006 | Radtke et al. ............... 715/708 | | | |
| 2006/0036965 | A1 | 2/2006 | Harris et al. ................. 715/777 | | | |
| 2006/0041545 | A1 | 2/2006 | Heidloff et al. ................. 707/4 | | | |
| 2006/0095865 | A1 | 5/2006 | Rostom ...................... 715/810 | | | |
| 2006/0101051 | A1 | 5/2006 | Carr et al. ................... 707/102 | | | |
| 2006/0101350 | A1 | 5/2006 | Scott .......................... 715/779 | | | |
| 2006/0111931 | A1 | 5/2006 | Johnson et al. ................. 705/1 | | | |
| 2006/0117249 | A1 | 6/2006 | Hu et al. ..................... 715/255 | | | |
| 2006/0129937 | A1 | 6/2006 | Shafron ....................... 715/733 | | | |
| 2006/0173824 | A1 | 8/2006 | Bensky ........................... 707/3 | | | |
| 2006/0218500 | A1 | 9/2006 | Sauve et al. ................. 715/767 | | | |
| 2006/0242557 | A1 | 10/2006 | Nortis, III ................... 715/234 | | | |
| 2006/0242575 | A1 | 10/2006 | Winser ....................... 715/530 | | | |
| 2006/0294452 | A1 | 12/2006 | Matsumoto ................. 715/236 | | | |
| 2007/0050401 | A1 | 3/2007 | Young et al. ................ 707/102 | | | |
| 2007/0106951 | A1 | 5/2007 | McCormack et al. ........ 715/764 | | | |
| 2007/0143671 | A1 | 6/2007 | Paterson et al. ............. 715/209 | | | |
| 2007/0185826 | A1 | 8/2007 | Brice et al. ..................... 707/1 | | | |
| 2007/0240057 | A1 | 10/2007 | Satterfield et al. ........... 715/705 | | | |
| 2007/0260996 | A1 | 11/2007 | Jakobson .................... 715/781 | | | |
| 2007/0279471 | A1 | 12/2007 | Garg et al. .................. 345/440 | | | |
| 2007/0300168 | A1 | 12/2007 | Bosma et al. ............... 715/820 | | | |
| 2008/0034304 | A1 | 2/2008 | Feuerbacher et al. ........ 715/764 | | | |
| 2008/0040682 | A1 | 2/2008 | Sorenson et al. ............ 715/777 | | | |
| 2008/0178110 | A1 | 7/2008 | Hill et al. .................... 715/771 | | | |
| 2009/0007003 | A1 | 1/2009 | Dukhon et al. .............. 715/778 | | | |
| 2009/0083656 | A1 | 3/2009 | Dukhon et al. .............. 715/781 | | | |
| 2009/0217192 | A1 | 8/2009 | Dean et al. .................. 715/777 | | | |
| 2009/0222763 | A1 | 9/2009 | Dukhon et al. .............. 715/808 | | | |

FOREIGN PATENT DOCUMENTS

| | | |
|---|---|---|
| EP | 1 672 518 | 6/2001 |
| EP | 1 223 503 | 7/2002 |
| EP | 1 376 337 | 2/2004 |
| EP | 1 835 434 A1 | 9/2007 |

OTHER PUBLICATIONS

Jane Dorothy Calabria Burke Ten Minute Guide to Lotus Notes 4.6 Publication Date Dec. 23, 1997.*

Bill Dyszel Microsoft Outlook 2000 for Windows for Dummies Copyright 1999 pp. 82-86, 102-103, 141-143.*

Gina Danielle Venolia and Carman Neustaedter Understanding Sequence and Reply Relationships within Email Conversations: A Mixed-Model Visualization CHI 2003 Apr. 5-10, 2003 vol. No. 5, Issue No. 1 pp. 361-368.*

Charles Rich et al., "Segmented Interaction History in a Collaborative Interface Agent,"1997, ACM, pp. 23-30.

Andrew Dwelly, "Functions and Dynamic User Interface," 1989, ACM, pp. 371-381.

Gordon Kurtenbach et al., "The Hotbox: Efficient Access to a Large Number of Menu-items,"ACM, 1999, pp. 231-237, May 1999.

Charles Rich et al., "Adding a Collaborative Agent to Graphical User Interfaces," 1996, ACM, pp. 21-30.

Boyce, "Microsoft Outlook Inside Out," 2001, pp. 67, 68,109, 110, 230, 231, 310, 316-318, 798.

Halvorson et al., "Microsoft Office XP Inside Out, " 2001, pp. 1005-1009, 1015, 1023-1028, 1036-1039, 1093.

Riggsby et al., "Mastering Lotus Notes and Domino 6," 2003, pp. 135-139.

Riggsby et al., "Mastering Lotus Notes and Domino 6," 2003, pp. 135-138, 607-612.

Khare et al., "The Origin of (Document) Species," University of California, 1998, 9 pgs.

"Separate Structure and Presentation," http://www.webreference.com/html/tutorial5/1.html, Aug. 20, 1998, 4 pgs.

"The Style Attribute and CSS Declarations," http://www.webreference.com/html/tutorial5/2, Aug. 20, 1998, 4 pgs.

"What's Hot in Internet Services?" http://www.webreference.com/html/tutorial5/3, Aug. 20, 1998, 3 pgs.

"The Style Element & CSS Selectors," http://www.webreference.com/html/tutorial5/4.html, Aug. 20, 1998, 3 pgs.

http://www.webreference.com/html/tutorial5/5.html, Aug. 20, 1998, 3 pgs.

"ID & Class Selectors, Pseudoclasses," http://www.webreference.com/html/tutorial5/6.html, Aug. 20, 1998, 3 pgs.

http://www.webreference.com/html/tutorial5/7.html, Aug. 20, 1998, 3 pgs.

http://www.webreference.com/html/tutorial5/8.html, Aug. 20, 1998, 2 pgs.

"External Style Sheets," http://www.webreference.com/html/tutorial5/9.html, Aug. 20, 1998, 3 pgs.

Raman, "Cascaded Speech Style Sheets," 1997, 7 pgs.

"Primary Windows,"http://www-03.ibm.com/servers/eserver/iseries/navigator/guidelines/primary.html, 23 pgs.

Schumaker, "User Interface Standards," http://msdn2.microsoft.com/en-us/library/aa217660(office.11.d=printer).aspx, Sep. 2001, 5 pgs.

Budinsky et al., "WebSphere Studio Overview," http://researchweb.watson.ibm.com/journal/sj/432/budinsky.html, May 6, 2004, 25 pgs.

Gordon Padwick, Using Microsoft Outlook 2000, Que Sp. Ed., May 1999.

Becker et al., "Virtual Folders: Database Support for Electronic Messages Classification," Pontificia Universidade Catolica do Rio Grande do Sul, Porto Alegre, Brazil, pp. 163-170.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "Niagara CQ: A Scalable Continuous Query System for Internet Databases,"Int. Conf. On Management of Data, Proc. Of the 2000 ACM SIGMOD Int. Conf. On Management of Data, pp. 379-390, 2000.

Marshall School of Business: "Workshop IV—Calendar," http://www.marshall.usc.edu/computing/PDF Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version 2002.03.25, http://www.uakron.edu/its/learning/training/docs/Calendar032502.pdf, Mar. 25, 2002, pp. 1-52.

Screen Dumps of Microsoft Outlook (1999, pp. 1-3).

"To-do-List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.

Microsoft Windows XP Professional, Version 2002, Service pack 2, 3 pgs.

Camarda, Using Microsoft Word 97, copyright 1997, QUE Corporation, pp. 412, 968.

Danish Written Opinion Appl. No. SG 200504508-3 dated Sep. 18, 2006.

Danish Search Report Appl. No. SG 200504475-5 dated Sep. 19, 2006.

NZ Application No. 541300, Examination Report dated Jul. 25, 2005.

Screendumps Microsoft Corporation, Microsoft Office Professional Edition 2003, 5 pgs.

Screendumps Microsoft Corporation, Microsoft Office Professional Edition 2003, 4 pgs.

Habraken, Microsoft Office XP 8 in 1, published Jun. 5, 2001, http://proquest.safaribooksonline.com/0789725096/, 12 pgs.

Word 2002, Chapter 14; Paradigm Publishing Inc., copyright 2002; http://www.emcp.com/tech_tutorials/sig_irc/Signature_Word_Chapter_14.ppt, 21 pgs.

Microsoft Office Word 2003. Part of Microsoft Office Professional Edition 2003. Copyright 1983-2003 Microsoft Corporation.

Microsoft Office 11 Beta Layperson's Specification, Copyright 2002, Microsoft Corporation, 28 pages.

FrontPage 11 Beta Layperson's Specification, Copyright 2002, Microsoft Corporation, 12 pages.

Office 11 Beta Letter, Copyright 2002, Microsoft Corporation, 6 pages.

Microsoft XDocs Beta Layperson Specification, Copyright 2002, Microsoft Corporation, 3 pages.

Microsoft Publisher 11 Beta Layperson's Specification, Copyright 2002, Microsoft Corporation, 13 pages.

Philippines Examiner's Action dated Aug. 19, 2008 cited in Application No. 1-2005-000405.

Chinese Second Office Action dated Oct. 10, 2008 cited in Application No. 200510092141.1.

Chinese Second Office Action dated Oct. 17, 2008 cited in Application No. 200510092139.4.

U.S. Final Office Action dated Oct. 28, 2008 cited in U.S. Appl. No. 11/151,686.

U.S. Office Action dated Nov. 25, 2008 cited in U.S. Appl. No. 11/154,278.

U.S. Office Action dated Dec. 11, 2008 cited in U.S. Appl. No. 10/982,073.

Chilean Office Action dated Nov. 27, 2008 cited in Appln No. 1768-2005.

Chilean Office Action dated Sep. 23, 2008 cited in Appln No. 1770-2005.

Chilean Office Action dated Nov. 27, 2008 cited in Appln No. 1769-2005.

Microsoft Office Word 2003, Part of Microsoft Office Professional Edition 2003, 1983-2003 Microsoft Corporation, screen shot 1, 1 pp.

Microsoft Office 2003, Microsoft Office Professional Edition 2003, Microsoft Corporation, 10 pages.

Screendumps—Microsoft Office, Microsoft Office Professional Edition 2003, Microsoft Corporation, 10 pages.

Screendumps—Microsoft Office Outlook, Microsoft Office Outlook Professional Edition 2003, Microsoft Corporation, 2 pages.

Chinese Second Office Action dated Nov. 21, 2008 cited in Appln No. 200510089514.X.

U.S. Official Action dated Jun. 19, 2008 cited in U.S. Appl. No. 10/851,506.

U.S. Official Action dated Jun. 20, 2008 cited in U.S. Appl. No. 10/955,928.

U.S. Official Action dated Jul. 17, 2008 cited in U.S. Appl. No. 10/955,940.

U.S. Official Action dated Dec. 23, 2008 in U.S. Appl. No. 10/955,942.

U.S. Official Action dated Dec. 24, 2008 in U.S. Appl. No. 10/955,967.

U.S. Official Action dated Jan. 6, 2009 in U.S. Appl. No. 10/955,941.

U.S. Appl. No. 12/372,386, filed Feb. 17, 2009 entitled "Command User Interface For Displaying Multiple Sections of Software Functionality Controls".

U.S. Office Action dated Mar. 18, 2009 in U.S. Appl. No. 11/401,470.

U.S. Office Action dated Apr. 7, 2009 in U.S. Appl. No. 10/955,940.

Chilean Second Office Action dated Mar. 4, 2009 cited in Appln No. 2512-2005.

U.S. Office Action dated Apr. 28, 2009 in U.S. Appl. No. 12/028,797.

Nielsen, Jacob. "Tabs, Used Right," Alertbox, Sep. 17, 2007, http://www.useit.com/alertbox/tabs.html, 6 pages.

"Managing the Code Editor and View" Microsoft Corporation, hap://msdn.microsoft.com/en-us/library/z01zks9a(VS.71).aspx, 2008.

Agarwal, Vikash K., "Creating a Visually Arresting User-Interface: A$_3$D Tab Control Example," Jan. 4, 2008, http://microsoft.apress.com/asptodayarchive/71723/creating-a-visually-arresting-user-interface-a-3d-tab-control-example, 12 pages.

"Omni Web Help," Omni Group, 2004, http://www.omnigroup.com/documentation/onmiweb/browser/tabs.html, 2 pages.

Hepfner, Troy, "New SOCET CXP Interface Improves Usability," Sep. 2008, http://www.socetset.com/gxpmosaic/?p=95, 4 pages.

Chinese Office Action dated Apr. 3, 2009 cited in Appln No. 200510089514.X.

Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.

Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.

Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.

Lisa K. Averett; Joshua R. Knisley; Mark A. Marvin; Haiti: Projecting Tactical Network and Systems Management; 1995 IEEE pp. 906-910.

Mexican Office Action dated Feb. 5, 2009 cited in Appin No. PA/a/2005/008349.

Mexican Office Action dated Mar. 3, 2009 cited in Appin No. PA/a/2005/008351 English language only.

Russian Office Action dated Jun. 24, 2009 cited in Appln No. 2005120363/28.

U.S. Official Action dated Feb. 22, 2008 in U.S. Appl. No. 11/445,393.

U.S. Official Action dated Oct. 8, 2008 cited in U.S. Appl. No. 11/445,393.

U.S. Official Action dated Jun. 1, 2009, U.S. Appl. No. 11/445,393.

U.S. Official Action dated Jun. 8, 2009 in U.S. Appl. No. 10/982,073.

U.S. Official Action dated Jun. 10, 2009 in U.S. Appl. No. 11/154,278.

U.S. Official Action dated Jun. 11, 2009 in U.S. Appl. No. 11/151,686.

U.S. Official Action dated Jun. 24, 2009 in U.S. Appl. No. 10/607,020.

"TeeChart for .NET Charting Control," TeeChart for NET Steema Software. http://Iwww.teechart.net.

"Convert to Word 2007," http://www.regencytraining.com/word-2007-conversion.html, Regency Training and Consulting, 2 pages (Date Printed Apr. 21, 2008).

"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).

"Inter-Widget Communication," http://web.mit.edu/6.115/www/miscfiles/amulet/amulet-help/IWC.htm, 6 pages (Feb. 13, 2007).

"The Technology in Document and Check Security," http://www.securedoc.In/thetechnology.htm, 7 pages (Date Printed Apr. 21, 2008).

Ando, R. et al., "Visualization-enabled multi-document summarization by Iterative Residual Rescaling," Natural Language Engineering, vol. 11, No. 1, pp. 67-86 (Mar. 2005) (2 page Abstract).

Bos, B, "Re: A proposal for addition to HTML 3.0: Frames," http://www.nyct.net/~aray/htmlwg/95q3/1141.html, 5 pages (Sep. 21, 1995).

de Candussio, N., "Common GUI Features Report," Herschel CSDT Meeeting, pp. 1-21 (Sep. 2007).

Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).

Rice, F, "Customizing the 2007 Office System Document Inspector," http://msdn2.microsoft.com/en-us/library/aa338203(d=printer).aspx, 10 pages (May 2006).

Boyce, "Microsoft Outlook Inside Out," 2001, pp. 133, 134, 721-728.

Halvorson et al., "Microsoft Office XP Inside Out," 2001, pp. 4, 5, 10, 11, 70-74, 281-288, 1010-1014, 1173-1175.

Pogue, David. "Windows XP Home Edition: The Missing Manual," O'Reilly, 1st Edition, May 1, 2002, pp. 37, 38, 41.

Screendumps—Microsoft Office, Microsoft Corporation, Microsoft Office Professional Edition 2003, 13 pages.

Supplementary European Search Report dated May 28, 2009 cited in EP Application No. 07795391.7-1225.

European Communication dated Jun. 9, 2009 cited in EP Application No. 07795391.7-1225.

Mexican Office Action dated Jun. 19, 2009 cited in Appln. No. PA/a/2005/007073.

Chinese Office Action dated Jul. 3, 2009 cited in Appln. No. 200680018095.3.

Russian Office Action dated Jul. 21, 2009 cited in Appln No. 2005125837/09.

Russian Office Action dated Jul. 30, 2009 cited in Appln No. 2005125831/09.

European Search Report dated Sep. 7, 2009 cited in EP Application No. 09006972.5-2211.

European Communication dated Sep. 14, 2009 cited in Appln. No. 07795391.7-1225.

U.S. Official Action dated Sep. 6, 2007 in U.S. Appl. No. 11/136,800.

U.S. Official Action dated May 30, 2008 cited in U.S. Appl. No. 11/430,562.

U.S. Official Action dated Jun. 27, 2008 cited in U.S. Appl. No. 11/430,416.

U.S. Official Action dated Jul. 9, 2008 cited in U.S. Appl. No. 11/136,800.

U.S. Official Action dated Aug. 4, 2009 in U.S. Appl. No. 10/955,967.

U.S. Official Action dated Aug. 4, 2009 in U.S. Appl. No. 10/955,942.

U.S. Official Action dated Aug. 18, 2009 in U.S. Appl. No. 11/782,059.

U.S. Official Action dated Sep. 23, 2009 in U.S. Appl. No. 11/401,470.

Berliner E.M. et al., "Microsoft Office 2003", Feb. 24, 2004, p. 39-40, 120-124, 175-177, 233-234 [D1].

Berliner E.M. et al., "Microsoft Office 2003", Feb. 24, 2004, p. 173-178 [D2].

Israeli Office Action dated Sep. 6, 2009 cited in Appln No. 169716.

Israeli Office Action dated Sep. 7, 2009 cited in Appln No. 169718.

Russian Office Action dated Sep. 10, 2009 cited in Appln No. 2005125836/09.

Russian Office Action dated Sep. 10, 2009 cited in Appln No. 2005125839/09.

European Communication dated Sep. 28, 2009 cited in Appln No. 09006972.5-2211.

U.S. Official Action dated Nov. 24, 2009 in U.S. Appl. No. 11/445,393.

Chinese Second Office Action dated Oct. 16, 2009 cited in Application No. 200510092142.6.

Russian Office Action dated Oct. 26, 2009 cited in Application No. 2005120363/09.

U.S. Office Action dated Nov. 13, 2009 cited in U.S. Appl. No. 11/154,278.

U.S. Final Office Action dated Dec. 8, 2009 cited in U.S. Appl. No. 11/151,686.

U.S. Final Office Action dated Dec. 9, 2009 cited in U.S. Appl. No. 12/028,797.

Paul J. Perronne, Kenkata S.R. "Krishna" R. Chaganti, "Building Java Enterprise Systems with J2EE," Publisher: Sams, Pub Date: Jun. 7, 2000, pp. 1-8.

U.S. Office Action dated Dec. 10, 2009 cited in U.S. Appl. No. 10/955,940.

U.S. Final Office Action dated Jan. 6, 2010 cited in U.S. Appl. No. 10/607,020.

Screendumps—Microsoft Office (Microsoft Corporation, Microsoft Office Professional Edition 2003; 16 pages).

Russian Office Action dated Dec. 28, 2009 cited in Appin No. 2005125836/09.

PCT Search Report and Written Opinion dated Dec. 29, 2009 cited in International Application No. PCT/US2009/046344.

Chilean Second Office Action dated Jan. 29, 2010 cited in Appln No. 1769-2005.

U.S. Official Acton dated Jan. 7, 2010 in U.S. Appl. No. 11/430,562.

U.S. Official Action dated Jan. 20, 2010 in U.S. Appl. No. 10/955,967.

U.S. Official Action dated Jan. 25, 2010 in U.S. Appl. No. 10/982,073.

U.S. Official Action dated Feb. 18, 2010 in U.S. Appl. No. 11/782,059.

U.S. Official Action dated Feb. 19, 2010 in U.S. Appl. No. 10/955,942.

U.S. Official Action dated Feb. 22, 2010 in U.S. Appl. No. 11/401,470.

* cited by examiner

CONVERSATION GROUPING OF ELECTRONIC MAIL RECORDS

CROSS REFERENCE TO RELATED APPLICATIONS

The present invention claims priority from U.S. Provisional Patent Application No. 60/484,437, entitled "Combined Outlook Bar and Folder List, Automatic Grouping, Adaptive Multi-Line View, Threaded View with Easier Access to all new Email, Search Folders," filed Jul. 1, 2003.

FIELD OF THE INVENTION

The present invention generally relates to computer-generated user interfaces. More particularly, the present invention relates to grouping electronic mail records in a computer-generated user interface by electronic mail conversation strings or threads.

BACKGROUND OF THE INVENTION

With the advent of the computer age, computer software users have grown accustomed to user-friendly software applications that help them write, calculate, organize, prepare presentations, send and receive electronic mail, make music, and the like. For example, modem electronic mail programs allow users to send and receive electronic mail to and from other users. Modem electronic mail programs also allow users to store sent or received mail in a variety of user-established storage folders.

According to prior electronic mail programs, a user interface may be provided for storing a list of received, sent or stored electronic mail messages or records. A typical electronic mail record includes information identifying a party from which an email message is received or to which an email message is sent. Additional information may identify the subject of the message and the time of message receipt or sending.

Prior systems allowed users to group email messages together in a user interface according to an electronic mail conversation. That is, all messages received by a user, sent by a user or stored by a user that are part of an electronic mail conversation between the user and other parties relating to a particular subject could be grouped together to allow the user to read, review, or otherwise dispose of messages included in a given electronic mail conversation. According to prior systems, when messages contained in a given conversation grouping were displayed, all messages included in the conversation grouping were displayed. All messages whether read or unread could be displayed or could be collapsed under a grouping heading. Unfortunately, when the user expanded the conversation grouping, or reviewed already displayed electronic mail messages under the conversation grouping heading, the user was required to review the list of all messages even though the user may only be interested in viewing unread messages. Additionally, if a conversation grouping contained only one email message, the user nonetheless had to select the conversation grouping heading for expansion to find that only a single email message item was included. Thus, the user had to perform unnecessary steps to read or otherwise dispose of single email messages placed in an electronic mail conversation grouping.

Accordingly, there is a need for an improved conversation grouping method and system for electronic mail records or messages. It is with respect to these and other considerations that the present invention has been made.

SUMMARY OF THE INVENTION

Embodiments of the present invention solve the above and other problems by providing an improved conversation grouping method and system for electronic mail records and messages. Electronic mail messages belonging to a common conversation thread, as identified by a common subject, may be selectively grouped together and displayed in an electronic mail user interface. A conversation grouping may be created for received, sent, or stored electronic mail messages.

According to aspects of the invention, a conversation grouping heading is displayed in the electronic mail user interface for each conversation grouping. Under each heading, any electronic mail messages that have not been read or that have been read and have been flagged for follow-up are automatically displayed under the conversation grouping heading without requiring a user to expand the conversation grouping. If only a single message is in the conversation grouping, that single message is displayed under the heading so that the user is not required to expand the grouping to select the sole message contained therein. That is, the user may select the sole message contained under the heading by selecting the displayed electronic mail message record without the need for expanding the grouping in which the sole message is contained. If desired, the user may further expand a conversation grouping to show all messages contained in the grouping whether read, flagged, unflagged or unread. In an expanded display mode, messages may be sorted within the grouping according to time of receipt, time of sending, or a variety of other sorting properties.

According to other aspects of the invention, if all messages in a given conversation grouping have been read and have not been flagged for follow-up, then the latest message received or sent in the conversation grouping is automatically displayed under the grouping heading so that the user does not encounter a conversation grouping heading without encountering at least a single electronic mail message contained in the associated grouping. As described above, if desired, all messages in the grouping of read and not flagged messages may be displayed under the grouping heading by selectively expanding the grouping.

At any time more than one electronic mail message belonging to a particular conversation thread is displayed under a given conversation grouping heading (whether an initial automatic display or an expanded display), each successively displayed message in the thread may be indented relative to the preceding message in the same thread in order to distinguish one conversation thread from another conversation thread in the same conversation grouping. For example, a reply to a previous message is indented relative to the previous message. A reply to the reply is indented relative to the first reply. Upon the occurrence of a message in the conversation grouping of the same subject, but that is not a reply to a previous message, indentation is discontinued for that message to indicate a "break" in the back-and-forth sequence of conversation replies in the previous conversation thread. Preferably, a minimum number of characters is always displayed for a given mail message regardless of the number of indented mail messages contained in a given conversation grouping record.

According to another aspect of the invention, in order to display only unread or flagged messages under a given conversation grouping prior to any further expansion of the grouping, the electronic mail program responsible for displaying the electronic mail messages builds a cached mail thread hierarchy. A list of conversation mail threads is built where each mail thread points to individual data items that represent individual mail messages and that hold temporary data about individual mail messages such as whether individual mail messages are to be automatically displayed or not under a conversation grouping heading, as described above.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved conversation grouping method and system for electronic mail records. According to embodiments of the present invention, electronic mail messages that are unread or flagged for follow-up are automatically displayed under an associated conversation grouping heading. For any conversation grouping containing a single unread or flagged electronic mail message, the single electronic mail message is displayed under the conversation grouping heading for review by a user. For a given conversation grouping having no unread or flagged electronic mail messages, at least the latest electronic mail message in the grouping is automatically displayed under an associated conversation grouping heading.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
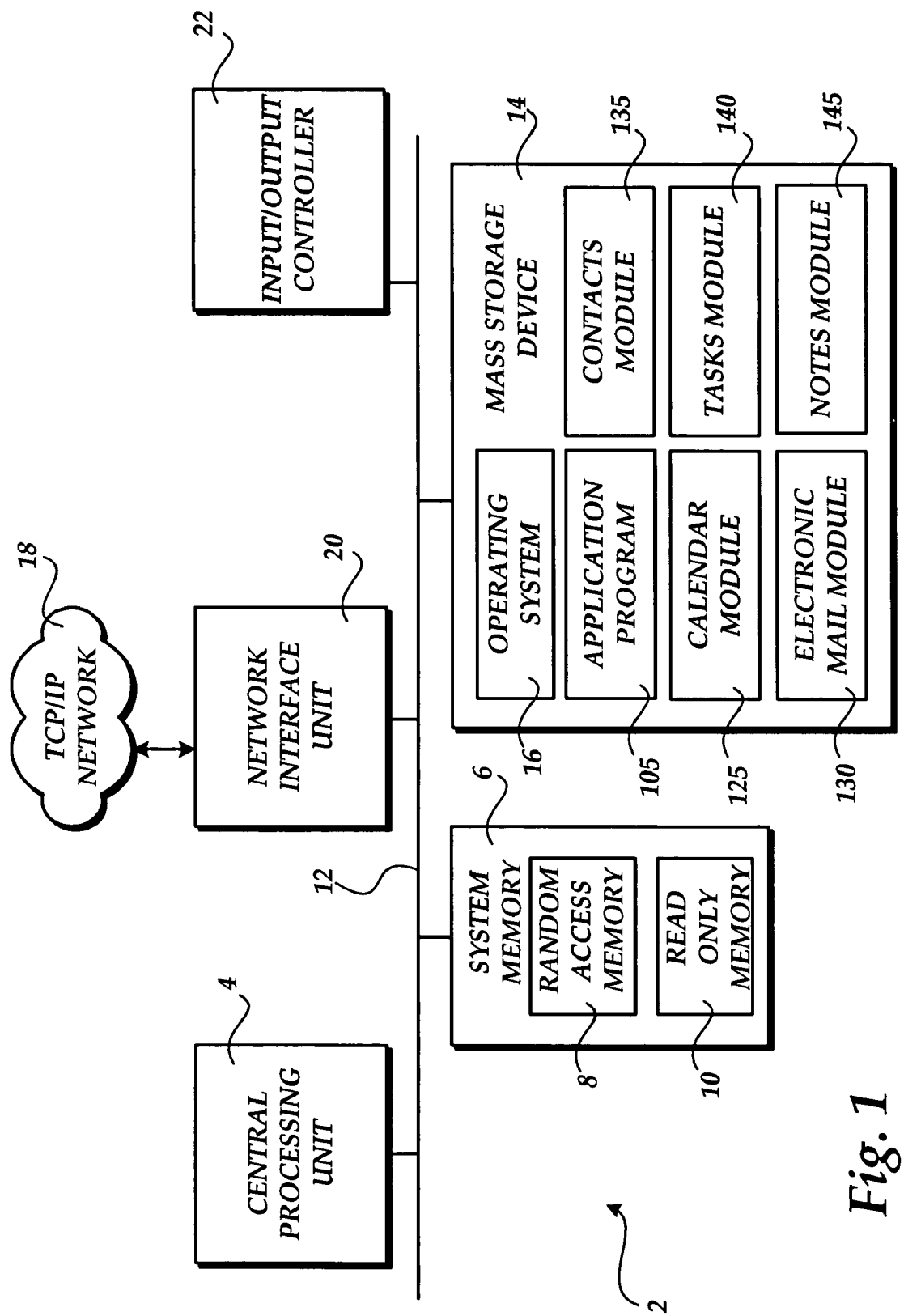
FIG. 1 illustrates an exemplary computing operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any. available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program, a spreadsheet application, a desktop publishing, and the like. According to an embodiment of the present invention, the application program 105 comprises a multiple functionality software application for providing a user calendaring functionality, electronic mail functionality, contacts information functionality, electronic notes functionality, electronic journal functionality and the like. Some of the individual program modules comprising the multiple functionality program include a calendar module 125, an electronic mail program 130, a contacts module 135, a tasks module 140, a notes module 145 and a journal module (not shown). An example of such a multiple functionality program 105 is OUTLOOK® manufactured by Microsoft Corporation.

Figure 2:
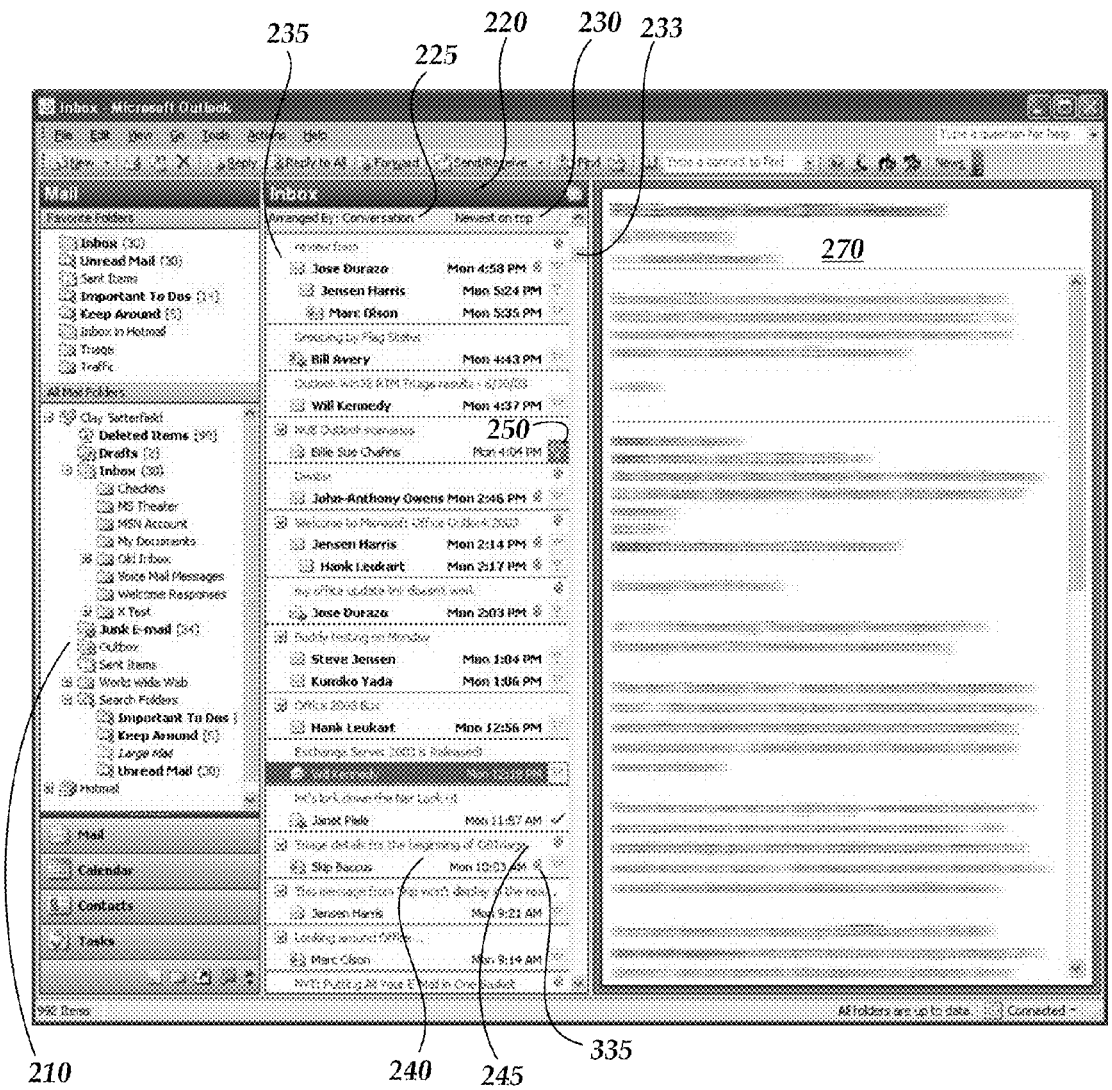
FIG. 2 illustrates a computer screen display showing an electronic mail program user interface according to embodiments of the present invention.

FIG. 2 illustrates a computer screen display showing an electronic mail program user interface according to embodiments of the present invention. The user interface is illustrative of an electronic mail program user interface for displaying electronic mail items received, sent or stored in a variety of storage folders. An example electronic mail program user interface, illustrated in FIG. 2, is provided by OUTLOOK® manufactured and marketed by Microsoft Corporation of Redmond, Wash.

The user interface illustrated in FIG. 2 includes a combined content selection and display pane 210 through which a user may select other types of functionality provided by a multiple functionality software application (described above) through which the user's electronic mail program may be provided. For example, through the combined contents selection and display pane 210, the user may select calendar functionality, contacts functionality, tasks functionality, notes functionality, and the like.

According to embodiments of the present invention, an inbox pane 220 is provided with which the user may view a listing of electronic mail messages that have been received by the user, that have been sent by the user, or which have been stored in one or more user-established storage folders. The inbox pane 220 is illustrative of an electronic mail program inbox with which the user may display and review a listing of electronic mail items received by the user. A number of electronic mail records such as the mail records 235 and 240 are listed in the inbox pane 220. A scroll button 233 is illustrated for allowing the user to scroll up or down through mail items listed in the inbox pane 220.

To the right of the inbox pane 220, a preview pane 270 is illustrated for displaying the contents of a selected mail item. As is appreciated by those skilled in the art, if the user has activated the preview pane functionality, the user may receive a preview of the contents of a selected mail message by focusing on the mail message in the inbox pane 220. For purposes of illustration only, the text and graphics displayed in the preview pane 270 are displayed in "Greeked" format where the actual substance of the text or graphics is not displayed in legible form.

Figure 3:
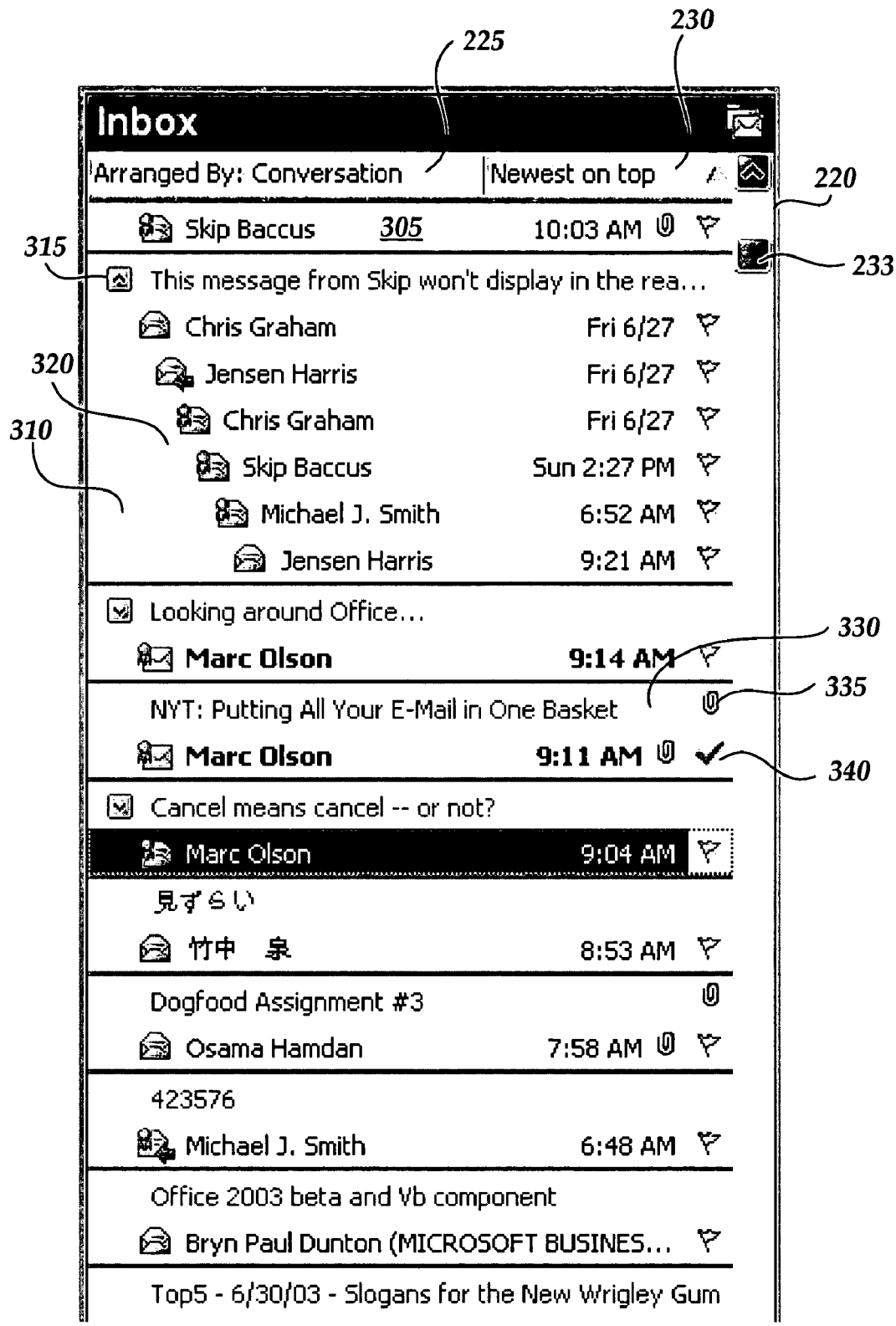
FIG. 3 illustrates a computer screen display showing an electronic mail inbox user interface showing electronic mail messages grouped together according to common conversations.

According to embodiments of the present invention, an "Arranged by" field 225 is provided along an upper edge of the inbox pane 220. When the user selects a given arrangement type, the selected arrangement type is identified in the "Arranged by" field. For example, referring to FIG. 2, an arrangement type of "Conversation" has been selected by the user and is thus identified in the "Arranged by" field 225. Electronic mail messages may be grouped together according to a number of arrangement types, including "Date," "Size," "Subject," presence or absence of properties such as attachments, and a variety of other arrangement types. For a detailed description of automatic grouping of electronic mail records according to a variety of arrangement types such as the "Conversation" type as illustrated in FIGS. 2 and 3, see U.S. Patent Application Ser. No. 10/848,774, "Automatic Grouping of Electronic Mail," applicant reference number MS301751.01, which is incorporated herein by reference as if full set out herein.

Adjacent to the "Arranged by" field 225 is a field 230 for identifying an overall sorting or ordering property applied to mail records displayed in the inbox pane 220. For example, if mail records displayed in the inbox pane 220 are displayed in a newest mail item on top orientation, the text in the field 230 may read "Newest on top." Conversely, if mail items in the inbox pane 220 are displayed according to a newest mail item at the bottom where oldest mail items are pushed to the top of the listing, the text in the field 230 may read "Newest on bottom", or "Oldest on top." The order with which mail records are sorted may be selectively changed by the user by toggling the field 230 or the associated toggling switch located on the right side of the text contained in the field 230. As should be appreciated a number of ordering properties may be utilized including the age of the mail, size of mail, and presence of applied properties, for example, flags, attachments and the like.

Referring still to the inbox pane 220, illustrated in FIG. 2, a user may expand or contract the size of the inbox pane 220 by dragging one side of the inbox pane 220 inward or outward as desired. For example, if the user desires to narrow the size of the inbox pane 220, the user may drag the right side of the user interface inward in order to allow for more space in the preview pane 270 positioned adjacent to the inbox pane 220. As the inbox pane 220 is narrowed, icons and text fields of individual mail records may be rearranged to account for the change in size of the user interface. For a detailed description of rearranging the contents of an electronic mail record as the size of the user interface in which the record is displayed is changed, see United States Patent Application Ser. No. 10/851,506, "Adaptive Multi-Line View User Interface," applicant reference number MS301754.01, which is incorporated herein by reference as if fully set out herein.

According to embodiments of the present invention, as illustrated in FIG. 2, the inbox pane 220 contains electronic mail records received by the user automatically grouped according to a "Conversation" arrangement type. Electronic mail messages belonging to a common conversation thread, as identified by a common mail subject, may be selectively grouped together and displayed in a conversation grouping record such as the record 235, illustrated in FIG. 2. A conversation grouping may be created for received, sent or stored electronic mail messages. As illustrated in FIG. 2, after electronic mail messages are arranged or grouped according to a conversation grouping arrangement, electronic mail messages that have a common subject are grouped together in a single electronic mail record having a conversation grouping heading for identifying the subject matter of electronic mail messages contained in the grouping. For example, referring to FIG. 2, a first conversation grouping record 235 is illustrated in the inbox pane 220. A heading "review form" is displayed over electronic mail messages received by the user and having a common subject of "review form."

As will be described in detail below, according to embodiments of the present invention, any electronic mail messages belonging to a given conversation grouping that are unread or that have been flagged for follow up by the user are automatically displayed under the conversation grouping heading as illustrated for the conversation grouping record 235. For example, the flag 250 illustrates a message that has been flagged by a user for follow up review. If a given conversation grouping contains only one unread or flagged electronic mail message, that single electronic mail message is nonetheless displayed under an associated conversation grouping heading as illustrated by the second electronic mail record illustrated in FIG. 2 bearing the heading "Grouping by flag status." Advantageously, then, a user is not required to expand a given conversation grouping in order to select unread or flagged electronic mail messages, and the user is not required to expand a conversation grouping heading in order to select a single unread or read electronic mail message contained in the conversation grouping. Referring to the electronic mail record 240, if a given conversation grouping contains only electronic mail messages that have been read and that have not been flagged for follow up, the latest received or sent electronic mail message in the conversation grouping is displayed under the grouping heading to alert the user of the presence of electronic mail messages in the conversation grouping.

According to embodiments of the invention and referring back to the first conversation grouping record 235, illustrated in FIG. 2, if the user reads one of the unread messages displayed in the conversation grouping record 235, the read message will be marked as having been read by displaying the read message with a lighter display font. If the user dismisses the inbox pane 220 or otherwise begins a new session of electronic mail program and subsequently displays the inbox pane 220 with electronic mail messages arranged in conversation grouping arrangement, the read message from the conversation grouping record 235 will no longer be displayed to the user. That is, only the unread messages will be displayed under the conversation grouping heading. On the other hand, if the message read by the user is marked for follow up by the user, the message marked for follow up will be displayed under the conversation grouping heading.

FIG. 3 illustrates a computer screen display showing an electronic mail inbox user interface showing electronic mail messages grouped together according to common conversations. As shown in the example inbox pane 220, illustrated in FIG. 3, individual electronic mail groupings may be sorted relative to each other according to a variety of sorting properties. For example, each of the different conversation groupings are sorted relative to each other based on time and date of receipt of the latest electronic mail message contained in each of the different conversation groupings. For example, referring to FIG. 3, the first conversation grouping 305 illustrated at the top of the inbox pane 220 bears a date/time of 10:03 AM. The second conversation grouping 310 bears a latest message receipt time of 9:21 AM. The third conversation grouping record bears a receipt time of 9:14 AM, and so on. As should be understood, the different conversation groupings may be sorted by other properties, for example, presence or absence of attachments, file size of the largest mail message, alphabetical conversation grouping headings, and the like.

Referring to the second conversation grouping record 310, illustrated in FIG. 3, and the first conversation grouping record 235, illustrated in FIG. 2, when a given record contains unread messages or messages that have been flagged for follow up, those messages are automatically displayed under the conversation grouping heading without the need for further expansion of the conversation grouping by the user. However, as described above, where a conversation grouping contains only messages that have been read and have not been flagged for follow up, only the latest electronic mail message in the conversation grouping is displayed under the conversation grouping heading. If desired, the user may further expand the conversation grouping so that all electronic mail messages contained in the conversation grouping are displayed.

Referring to the conversation grouping 310, illustrated in FIG. 3, the user may select the button 315 for expanding the conversation grouping to display all electronic mail messages contained in the conversation grouping. Conversely, the user may collapse the record by selection of the button 315 to return the displayed conversation grouping record to the automatic display mode. For example, referring to the third conversation grouping, illustrated in FIG. 3, a single unread message from a mail sender "Marc Olson" is illustrated having an unexpanded chevron button disposed adjacent to the conversation grouping heading. Because a single unread message is displayed, the user may readily determine that only one unread message is included in the conversation grouping. However, because of the presence of the chevron button 315 located adjacent to the conversation grouping heading, the user understands that additional electronic mail messages are contained in the grouping that have been previously read and have not been flagged for follow up. By selection of the chevron button 315, the user may expand the conversation grouping to display the additional electronic mail messages contained in the grouping. On the other hand, the fourth conversation grouping record 330 also displays a single electronic mail message from a mail sender "Marc Olson," but the absence of a chevron button 315 for this record alerts the user that no additional electronic mail messages, whether read or unread, are included in this conversation grouping.

Referring back to the first conversation grouping record 235, illustrated in FIG. 2, and the second conversation grouping 310, illustrated in FIG. 3, when more than one electronic mail message is included in a given conversation thread, whether displayed automatically, or whether displayed after expansion of the conversation grouping, each successive electronic mail message in the conversation thread is displayed in an indented orientation relative to a preceding electronic mail message in the same thread in order to distinguish one conversation thread from another conversation thread in the same conversation grouping. For example, a reply to a previous message is indented relative to the previous message. A reply to the reply is indented relative to the first reply. Upon the occurrence of a message in the conversation grouping of the same subject, but that is not a reply to a previous message, indentation is discontinued for that message to indicate a "break" in the back-and-forth sequence of conversation replies in the previous thread. According to an embodiment of the present invention, no indented displayed electronic mail message is displayed with less than a minimum number of characters (e.g., ten characters). Utilization of a minimum number of displayed characters insures that a user will always be able to view a portion of identification information associated with a given electronic mail message so that the user may determine the nature of the electronic mail message and whether the user desires to review or otherwise dispose of the displayed electronic mail message.

Referring to the fourth conversation grouping 330, illustrated in FIG. 3, a variety of icons may be displayed for providing additional information to a user. For example, the attachment icon 335 is displayed adjacent to the conversation grouping heading to alert the user that one or more electronic mail messages contained in the conversation grouping includes an attachment. An attachment icon is also displayed to the right of a single electronic mail message contained in the conversation grouping record 330 to alert the user that the electronic mail message includes an attached file or document. Other icons such as the header icon 340 may be displayed for providing other types of information to the user. For example, the header icon 340 may be used to indicate to the user that the entire electronic mail message file associated with the displayed electronic mail message has not been downloaded from an associated electronic mail server to the user's client-side computer. That is, the icon 340 alerts the user that only identification information such as the identity of the mail sender and the time and date of receipt of the electronic mail message are displayed to the user, and the associated electronic mail message text and/or an attached file or document has not been downloaded to the user's computer. As is well known to those skilled in the art, such functionality allows a user to avoid having excessively large electronic mail message text files or attached documents automatically downloaded to the user's client-side computer until the user selects the electronic mail message.

Figure 4:
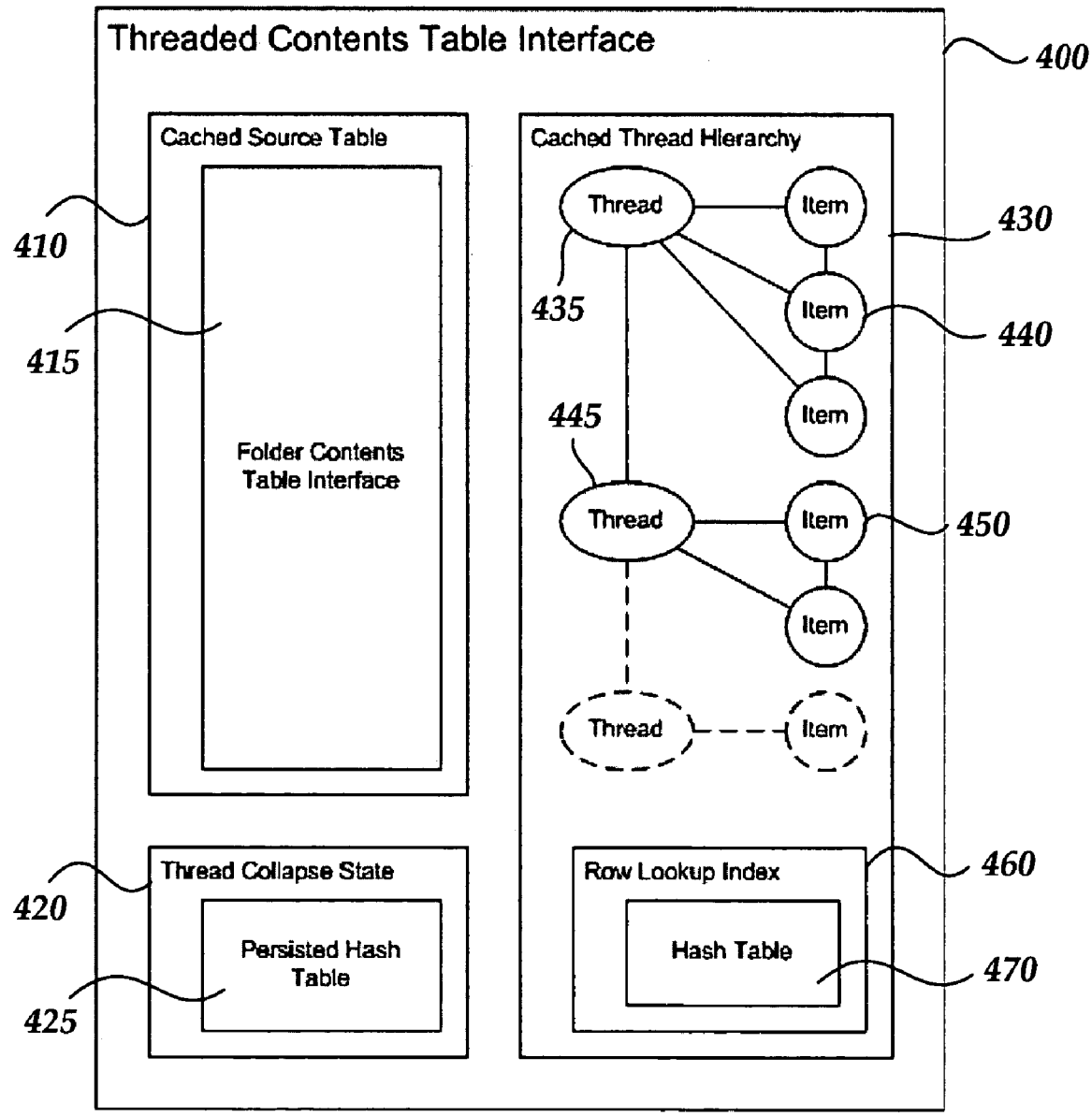
FIG. 4 is a simplified block diagram illustrating the relationship between a cached source table and a cached thread hierarchy for showing unread and/or flagged messages in a conversation grouping according to embodiments of the present invention.

As described above, according to embodiments of the present invention, when a given conversation grouping contains email messages that have not been read or that have been read and that have been flagged for follow up, those messages are automatically displayed under an associated conversation grouping heading, such as the messages displayed in the first conversation grouping record 235, illustrated in FIG. 2. In order to display only unread or flagged email messages in a given conversation grouping, the electronic mail program 130 must track and account for those messages associated with a given conversation thread that have been read or that have been flagged for follow up. Referring to FIG. 4, according to an embodiment of the present invention, the email program 130 maintains a cached source table 410 and an associated folder contents table interface 415 for storing data associated with conversation threads (electronic mail messages of a common conversation or common subject). The folder contents table interface 415 is utilized by the electronic mail program 130 for interfacing electronic mail messages belonging to a given conversation thread that have been stored by the user in one or more storage folders. A thread collapse state 420 and an associated persisted hash table 425 are utilized by electronic mail program 130 for maintaining data associated with conversation groupings that are collapsed versus conversation groupings that are expanded.

According to embodiments of the present invention, the electronic mail program 130 builds a cached thread hierarchy 430 for electronic mail messages that have not been read or that have been flagged for follow up. A list of conversation mail threads, 435, 445 is built where each mail thread 435, 445 represents a given electronic mail conversation grouping. Each of the mail threads points to individual data items 440, 450 that represent individual mail messages associated with a given conversation mail thread. The data items 430, 450 hold temporary data about individual mail messages, such as whether a particular mail message is to be automatically displayed or not under a given conversation grouping heading. A row look-up index 460 and a hash table 470 are provided for maintaining the data associated with the location in memory of individual electronic mail messages.

Referring then to the first conversation grouping record 235, illustrated in FIG. 2, a mail thread 435 is established in the cached thread hierarchy for the conversation grouping record 235. Data items 440 representing each electronic mail message contained in the conversation grouping record 235 are pointed to by the thread 435. Each data item 440 is associated with a given electronic mail message contained in the conversation grouping and holds temporary data, about associated electronic mail messages. Consequently, for each of the unread messages contained in the conversation grouping record 235, a data item in the cached thread hierarchy will contain information pointed to by the mail thread 435 to notify the electronic mail program 130 that those electronic mail messages have not been read and that they should be automatically displayed in the conversation grouping record 235 under the appropriate conversation grouping heading when the user arranges the user's email messages by "Conversation."

Having described exemplary operation and display of an improved electronic mail conversation grouping method and system with respect to FIGS. 2, 3 and 4 above, it is advantageous to describe operation of the conversation grouping method and system in terms of an example operation. Consider, for example that a user goes home for the evening, and while the user is home and is not receiving electronic mail, the user receives the following new electronic mail messages set out in Table 1. It should be appreciated that the electronic mail messages set out below are for purposes of example only and are not set out according to a particular format as may typically be displayed to the user. For each message set out below, the time of receipt, the identity of the sending party and the subject are provided.

TABLE 1

5:48 PM, Jane Miller, trade show
5:49 PM, John Smith, trade show
6:21 PM, Ronald Ambrose, meeting directions
9:15 PM, Jane Miller, trade show
6:48 AM, Manuel Moreno, check this website out
7:35 AM, Robert Jones, business cards
7:49 AM, Facilities, new no parking zones
7:52 AM, Jane Miller, trade show If the user's electronic mail messages are simply sorted by date where unread messages are boldfaced and read messages are not boldfaced, the user's electronic mail messages may be presented or displayed as set out in Table 2 below.

TABLE 2

7:52 AM, Jane Miller, trade show
7:49 AM, Facilities, new no parking zones
7:35 AM, Robert Jones, business cards
6:48 AM, Manuel Moreno, check this website out
9:15 PM, Jane Miller, trade show
6:21 PM, Ronald Ambrose, meeting directions
5:49 PM, John Smith, trade show
5:48 PM, Jane Miller, trade show
4:45 PM, Joe Brown, company dinner (already read)
4:20 PM, Alfred Baker, office furniture (already read)
3:25 PM, Alfred Baker, office furniture (already read)

If the user selects to have her electronic mail messages grouped according to a prior "Conversation" grouping system described in the background section above, the user likely will receive a list of grouping headings such as set out below in Table 3. Unfortunately, under the prior system, the user must expand each heading to view mail contained under each heading. And, if a given grouping, for example, "trade show," contains the four new messages listed above plus five older messages already read by the user, the expanded view will contain all nine messages sorted by some sorting property, such as date. The user will have to parse the expanded list of messages to find those that have not been read. In addition, for any grouping containing only a single message (read or unread), for example, "company dinner," the user will have to expand the grouping and then select the single message in order to review or otherwise dispose of the message.

TABLE 3

+ trade show
+ new no parking zones
+ business cards
+ check this website out
+ meeting directions
+ company dinner
+ office furniture According to embodiments of the present invention, if the user selects to have the received electronic mail messages grouped according to a "Conversation" arrangement, conversation grouping headings and certain received messages may be displayed as set out in Table 4 below. As seen in Table 4, each of the unread messages

TABLE 4

+ trade show
   Jane Miller, 5:48 PM
   John Smith, 5:49 PM
   Jane Miller, 9:15 PM
   Jane Miller, 7:52 AM
new no parking zones
   Facilities, 7:49 AM
business cards
   Robert Jones, 7:35 AM
check this website out
   Manuel Moreno, 6:48 AM
meeting directions
   Ronald Ambrose, 6:21 PM
company dinner
   Joe Brown, 4:45 PM
+ office furniture
   Alfred Baker, 4:20 PM grouped under the "trade show" heading are automatically displayed so that the user does not have to expand the grouping to see those messages. If the user does desire to see any messages in that grouping that have been read, the user may select the icon disposed adjacent to the heading to further expand the grouping to view all messages contained in the grouping. Single messages are contained in the "new no parking zones," "business cards," "check this website out," and "meeting directions" conversation groupings, but those messages are automatically displayed under the corresponding headings so that the user may quickly select the messages without the need to first expand the grouping followed by selection of the desired message. Similarly, a single read message is contained in the "company dinner" grouping, but the single message is automatically displayed under the heading. In the case of the "office furniture" grouping, two read messages are included. According to embodiments of the present invention, the latest read message is automatically displayed under the heading, and an expansion icon is disposed adjacent to the heading to allow the user to further expand the grouping to view additional messages contained in the grouping.

As described herein, improved electronic mail message conversation grouping methods and systems are provided. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for displaying electronic mail messages in a conversation grouping, comprising:
receiving a plurality of electronic mail messages having a common subject;
associating each of the plurality of electronic mail messages having common subject with at least one conversation grouping;
when at least one of the plurality of electronic mail messages associated with the at least one conversation grouping has not been read or has been flagged for follow up, designating the at least one of the plurality of electronic mail messages associated with the at least one conversation grouping that has not been read or that has been flagged for follow up for display in a conversation grouping record under a conversation grouping heading;
in the conversation grouping record displayed in a user interface, automatically displaying the conversation grouping heading on a first line in the conversation grouping record, displaying all the designated electronic mail messages that have not been read or that have been flagged for follow up in successive lines in the conversation grouping record beneath the conversation grouping heading;
determining whether at least one other of the plurality of electronic mail messages associated with the at least one conversation grouping has been read or has not been flagged for follow up; and
when at least one other of the plurality of electronic mail messages associated with the at least one conversation grouping has been read and has not been flagged for follow up, displaying an indicator comprising a button, adjacent to the conversation grouping record for expanding and collapsing additional messages which have already been read and have not been flagged for follow up which are associated with the conversation grouping record but are not displayed.

2. The method of claim 1, whereby if all of the plurality of electronic mail messages have been read and none of the plurality of electronic mail messages have been flagged for follow up, designating a latest one of the plurality of electronic mail messages for display in the conversation grouping record beneath the conversation grouping heading.

3. The method of claim 2, further comprising in the conversation grouping record displayed in the user interface, displaying the conversation grouping heading on a first line in the conversation grouping record, and displaying the designated latest one of the plurality of electronic mail messages in a second line in the conversation grouping record beneath the conversation grouping heading.

4. The method of claim 3, whereby if more than one electronic mail message is displayed in the conversation grouping record, displaying each of the plurality of electronic mail messages in successive lines beneath the conversation grouping heading.

5. The method of claim 4, further comprising displaying each of the more than one electronic mail messages that comprise a common conversation thread in an indented orientation relative to a preceding displayed electronic mail message belonging to the common conversation thread.

6. The method of claim 5, further comprising displaying a minimum portion of each of the more than one electronic mail messages in the conversation grouping record.

7. The method of claim 6, whereby displaying a minimum portion of each of the plurality of electronic mail messages in the conversation grouping record includes displaying at least 10 characters of each of the more than one electronic mail messages displayed in the conversation grouping record.

8. The method of claim 3, further comprising expanding the conversation grouping record and displaying all of the plurality of electronic mail messages associated with the conversation grouping beneath the conversation grouping heading whether or not any of the plurality of electronic mail messages have been read or flagged for follow up.

9. The method of claim 3, whereby if more than one unread or flagged for follow up electronic mail message is displayed in the conversation grouping record beneath the conversation grouping heading, and one of the more than one unread or flagged for follow up electronic mail messages is read or unflagged for follow up, removing the read or unflagged for follow up electronic mail message from display in the conversation grouping record upon a subsequent display of the conversation grouping record.

10. The method of claim 3, further comprising displaying at least one icons adjacent to the conversation grouping heading for representing at least one property associated with each of the plurality of electronic mail messages associated with the conversation grouping record.

11. The method of claim 1, prior to displaying the conversation grouping heading, preparing a conversation grouping heading for identifying the common subject of the plurality of electronic mail messages.

12. The method of claim 1, whereby displaying the conversation grouping heading on a first line in the conversation grouping record includes displaying the conversation grouping heading only once per a given conversation grouping.

13. A system for providing an electronic mail user interface comprising:
    a processor;
    a memory; and
    an e-mail client comprising:
        at least one conversation grouping, the at least one conversation grouping record comprising:
            a conversation grouping heading on a first line in the conversation grouping record, the conversation grouping heading for identifying a common subject of at least one electronic mail message;
            a least one successive text fields disposed beneath the conversation grouping heading for automatically displaying each of the electronic mail messages that have not been read or that have been flagged for follow up, whereby when more than one successive text field is disposed beneath the conversation grouping heading for automatically displaying more than one electronic mail message of a common conversation thread that has not been read or that has been flagged for follow up, then each of the more than one successive text fields of the common conversation thread is displayed in an indented orientation relative to a preceding text field belonging to the common conversation thread,
            at least one text field disposed beneath the conversation grouping heading for automatically displaying a latest one of the plurality of electronic mail messages when all of the plurality of electronic mail messages have been read and non of the plurality of electronic mail messages have been flagged for follow up, and
            a user interface control, comprising a button, displayed adjacent to the conversation grouping record for indicating whether additional messages which have already been read and have not been flagged for follow up are associated with the conversation grouping record but are not displayed;
        whereby the conversation grouping record is expandable for displaying all of the plurality of electronic mail messages beneath the conversation grouping heading whether or not any of the plurality of electronic mail messages have been read or flagged for follow up; and
        at least one icon displayed adjacent to the conversation grouping heading for representing at least one property associated with the plurality of electronic mail messages contained in the conversation grouping record.

14. A computer-readable storage medium on which is stored computer-executable instructions which when executed by a computer perform a method for displaying electronic mail messages in a conversation grouping, comprising;
    receiving a plurality of electronic mail messages belonging to a common electronic mail conversation thread;
    displaying a conversation grouping heading on a first line of a conversation grouping record for identifying the common electronic mail conversation thread of the plurality of electronic mail messages;
    when any of the plurality of the electronic mail messages have not been read or have been flagged for follow up, displaying all of the plurality of electronic mail messages that have not been read or that have been flagged for follow up on a second line of the conversation grouping record beneath the conversation grouping heading;
    determining whether at least one other of the plurality of electronic mail messages associated with the at least one conversation grouping has been read or has not been flagged for follow up;
    when at least one other of the plurality of electronic mail messages associated with the at least one conversation grouping has been read and has not been flagged for follow up, displaying an indicator, comprising a button, adjacent to the conversation grouping record for expanding and collapsing additional messages which have already been read or have not been flagged for follow up which are associated with the conversation grouping record but are not displayed; and
    when all of the plurality of electronic mail messages have been read and none of the plurality of electronic mail messages have been flagged for follow up, displaying a latest one the plurality of electronic mail messages on the second line of the conversation grouping record beneath the conversation grouping heading.

15. The computer-readable storage medium of claim 14, whereby if more than one electronic mail message is displayed in the conversation grouping record, displaying each of the plurality of electronic mail messages in successive lines beneath the conversation grouping heading.

16. The computer-readable storage medium of claim 15, further comprising instructions for displaying each of the more than one electronic mail messages that comprise a common conversation thread in an indented orientation relative to a preceding displayed electronic mail message belonging to the common conversation thread.

17. The computer-readable storage medium of claim 16, further comprising instructions for displaying a minimum portion of each of the more than one electronic mail messages in the conversation grouping record.

18. The computer-readable storage medium of claim 15, whereby if more than one unread or flagged for follow up electronic mail message is displayed in the conversation grouping record beneath the conversation grouping heading, and one of the more than one unread or flagged for follow up electronic mail messages is read or unflagged for follow up, removing the read or unflagged for follow up electronic mail message from display in the conversation grouping record upon a subsequent display of the conversation grouping record.

* * * * *